US008132019B2

(12) United States Patent
Springfield et al.

(10) Patent No.: US 8,132,019 B2
(45) Date of Patent: Mar. 6, 2012

(54) ARRANGEMENTS FOR INTERFACING WITH A USER ACCESS MANAGER

(75) Inventors: Randall S. Springfield, Chapel Hill, NC (US); Joseph M. Pennisi, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 794 days.

(21) Appl. No.: 12/140,784

(22) Filed: Jun. 17, 2008

(65) Prior Publication Data

US 2009/0313478 A1 Dec. 17, 2009

(51) Int. Cl.
*G06F 21/00* (2006.01)
(52) U.S. Cl. ........ 713/184; 713/182; 713/185; 713/186; 713/183; 713/176; 382/115; 726/2; 726/18; 726/6; 726/19; 726/7; 726/21; 726/20; 726/4; 726/26; 726/28; 726/29; 726/30; 705/18; 705/72; 380/255; 380/277; 380/284
(58) Field of Classification Search .................. 713/176, 713/182, 184, 186, 185, 183; 726/26, 2, 726/18, 6, 19, 7, 21, 20, 4, 28, 29, 30; 380/225, 380/284, 255, 277; 382/115; 902/3; 705/18, 705/72
See application file for complete search history.

(56) References Cited

U.S. PATENT DOCUMENTS

| | | | |
|---|---|---|---|
| 6,055,592 A | 4/2000 | Smith | |
| 6,192,130 B1 * | 2/2001 | Otway | 380/277 |
| 6,317,829 B1 * | 11/2001 | Van Oorschot | 713/155 |
| 6,557,104 B2 * | 4/2003 | Vu et al. | 713/189 |
| 6,836,556 B1 | 12/2004 | Bromba et al. | |
| 7,273,181 B2 * | 9/2007 | White et al. | 235/486 |
| 7,376,968 B2 * | 5/2008 | Ritz et al. | 726/17 |
| 7,562,214 B2 * | 7/2009 | Riordan | 713/164 |
| 7,711,942 B2 * | 5/2010 | Wang et al. | 713/2 |
| 7,716,484 B1 * | 5/2010 | Kaliski, Jr. | 713/176 |
| 7,831,833 B2 * | 11/2010 | Gaylor | 713/176 |
| 7,861,078 B2 * | 12/2010 | Funk | 713/155 |
| 7,886,355 B2 * | 2/2011 | Rager et al. | 726/21 |
| 2002/0046050 A1 * | 4/2002 | Nakazawa et al. | 705/1 |
| 2002/0087877 A1 * | 7/2002 | Grawrock | 713/200 |
| 2002/0169961 A1 * | 11/2002 | Giles et al. | 713/175 |

(Continued)

FOREIGN PATENT DOCUMENTS

EP 1244273 5/2002

(Continued)

OTHER PUBLICATIONS

IDF: 2008er vPro-Generation mit Danbury-Technologie. Im Internet:>URL: http://www.tecchhannel.de/pc_mobile/news/1733910/idf_2008er_vpro_generation_mit_danbury_technologie/, Sep. 19, 2007.

*Primary Examiner* — April Shan
(74) *Attorney, Agent, or Firm* — Ference & Associates LLC

(57) ABSTRACT

Arrangements which permit the employment of dedicated user-access management architecture with more than text-based access. Particularly contemplated herein are arrangements for accepting user identifiers that are then communicated to an intermediate user-delineating architecture (i.e., architecture configured for permitting access to encrypted data or sections of a computer on a user-specific basis) in a manner to permit the user-delineating architecture to perform its own task of unlocking data or sections of a computer.

22 Claims, 2 Drawing Sheets

U.S. PATENT DOCUMENTS

| | | |
|---|---|---|
| 2003/0005310 A1 | 1/2003 | Shinzaki |
| 2003/0072454 A1* | 4/2003 | Krawetz ......................... 380/284 |
| 2003/0163575 A1* | 8/2003 | Perkins et al. ................. 709/229 |
| 2004/0267946 A1* | 12/2004 | Caplin et al. ................... 709/229 |
| 2005/0111664 A1* | 5/2005 | Ritz et al. ...................... 380/255 |
| 2005/0123137 A1* | 6/2005 | McCallum ................... 380/255 |
| 2006/0080819 A1* | 4/2006 | McAllister ................... 29/403.3 |
| 2006/0083372 A1* | 4/2006 | Chang et al. ..................... 380/44 |
| 2006/0085636 A1* | 4/2006 | Osaki ............................ 713/165 |
| 2006/0229911 A1* | 10/2006 | Gropper et al. ................... 705/2 |
| 2007/0022479 A1* | 1/2007 | Sikdar et al. ..................... 726/22 |
| 2007/0061561 A1 | 3/2007 | Hashiguchi |
| 2007/0192843 A1* | 8/2007 | Peterson et al. ................. 726/10 |
| 2007/0228179 A1* | 10/2007 | Atkinson ....................... 235/487 |
| 2009/0054038 A1* | 2/2009 | Ranjan et al. ............... 455/412.1 |
| 2009/0080660 A1* | 3/2009 | Mo et al. ....................... 380/279 |
| 2010/0100724 A1* | 4/2010 | Kaliski, Jr. .................... 713/155 |

FOREIGN PATENT DOCUMENTS

| | | |
|---|---|---|
| WO | 03044744 | 5/2003 |

* cited by examiner

ARRANGEMENTS FOR INTERFACING WITH A USER ACCESS MANAGER

FIELD OF THE INVENTION

The present invention relates generally to methods and arrangements for managing user access in a computer system, and particularly to arrangements for interfacing with such managers.

BACKGROUND OF THE INVENTION

Historically, security issues in the context of computer systems have extended to the challenge of managing access by different users to different parts of a system when such users commonly employ the same system. For instance, in a small business setting, certain parts of a system may need to be off limits to support staff while being accessible to the proprietor.

Such challenges have long been addressed at the operating system level, such as when a small business server is employed. There, each individual associated with the business can have a username and password, whereby one or more given usernames would be availed of more access to more parts of the system. However, managing such access at the level of a single machine (e.g., a single desktop or laptop computer irrespective of its connectivity with any external entity such as a server) was long elusive historically.

Recently, however, Intel has developed the "DANBURY" architecture which is configured to control access at a machine user by user, regardless of the operating system which may be running at the machine. This access is controlled at the BIOS level and thus is essentially hard-wired into the machine.

One advantage of this architecture, as presently understood, is a level of distinction beyond conventional full disk encryption (FDE). Particularly, whereas conventional FDE works solely on the disk, whereby data going to the disk (e.g., over a cable) would not be encrypted, "DANBURY" places an encryption engine on the computer motherboard so that data going to the disk already is encrypted.

As such, text-based passwords are entered by users which respectively allow the architecture to control what each user has access to (based ostensibly on predetermined criteria or settings). However, the architecture appears rather limited in only permitting text-based access.

This can present a problem in the context of systems where text-based access does not necessarily represent the sole desired mode of access to a system. This also points to an even greater problem where, for instance, in the face of essentially any architecture configured for controlling user access ("DANBURY" or otherwise), a system might be severely restricted as to how such access might be effected; to restrict a system, e.g., solely to text-based access can rob a system of the very degree of flexibility and versatility for which it might otherwise be designed.

Accordingly, a compelling need has been recognized in connection with addressing such challenges.

SUMMARY OF THE INVENTION

In accordance with at least one presently preferred embodiment of the present invention, there are broadly contemplated herein arrangements which permit the use of architecture such as "DANBURY" with more than text-based access. Particularly, there is contemplated herein an arrangement which permits an alternative user identifier, such as a biometric identifier, to be used with user-delineating architecture such as "DANBURY".

In a particularly broad sense, there are contemplated herein arrangements for accepting user identifiers that are then communicated to an intermediate user-delineating architecture (i.e., architecture configured for permitting access to encrypted data or sections of a computer on a user-specific basis) in a manner to permit the user-delineating architecture, whatever it may be, to perform its own task of unlocking data or sections of a computer. The user-delineating architecture may thus be thought of as a "black box" that arrangements in accordance with at least one embodiment of the present invention are configured for suitably interfacing with in order to prompt the "black box" to initiate and undertake its own predetermined actions. In accordance with at least one presently preferred embodiment of the present invention, one or more suitable credentials are presented that suitably prompt the "black box" into action.

In summary, one aspect of the invention provides a method comprising the steps of: receiving a user identification input; thereupon releasing a decryption key; converting the decryption key to a credential for input to architecture for managing user-based system access.

Another aspect of the invention provides an apparatus comprising: a main memory; a BIOS which acts to receive user identification input, said BIOS being in communication with said main memory; said BIOS acting to release a decryption key responsive to user identification input; and a converter which converts the decryption key to a credential for input to architecture for managing user-based system access.

Furthermore, an additional aspect of the invention provides a program storage device readable by machine, tangibly embodying a program of instructions executable by the machine to perform a method comprising receiving a user identification input; thereupon releasing a decryption key; converting the decryption key to a credential for input to architecture for managing user-based system access.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
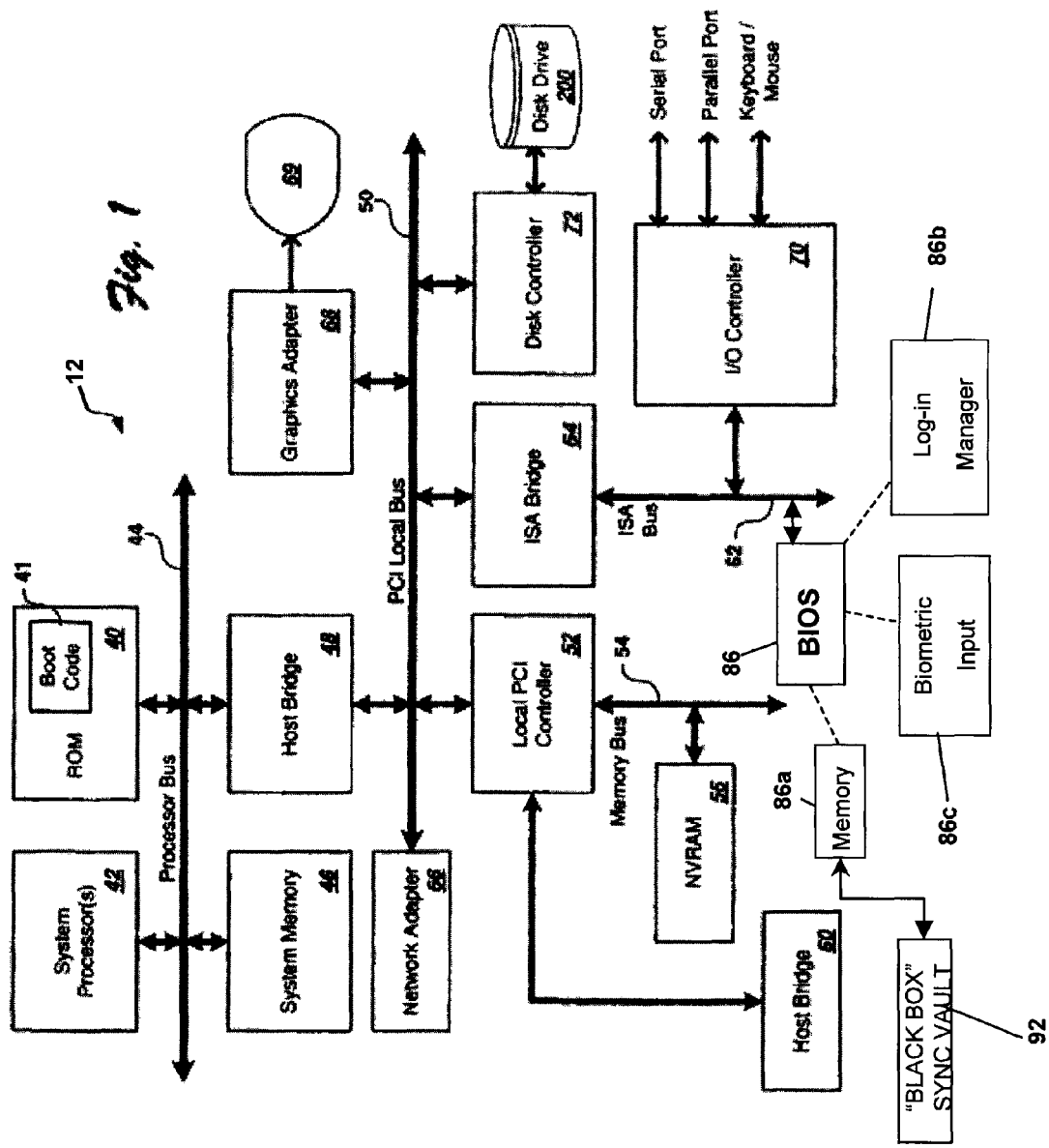
FIG. 1 schematically illustrates a computer system with added components.
Figure 2:
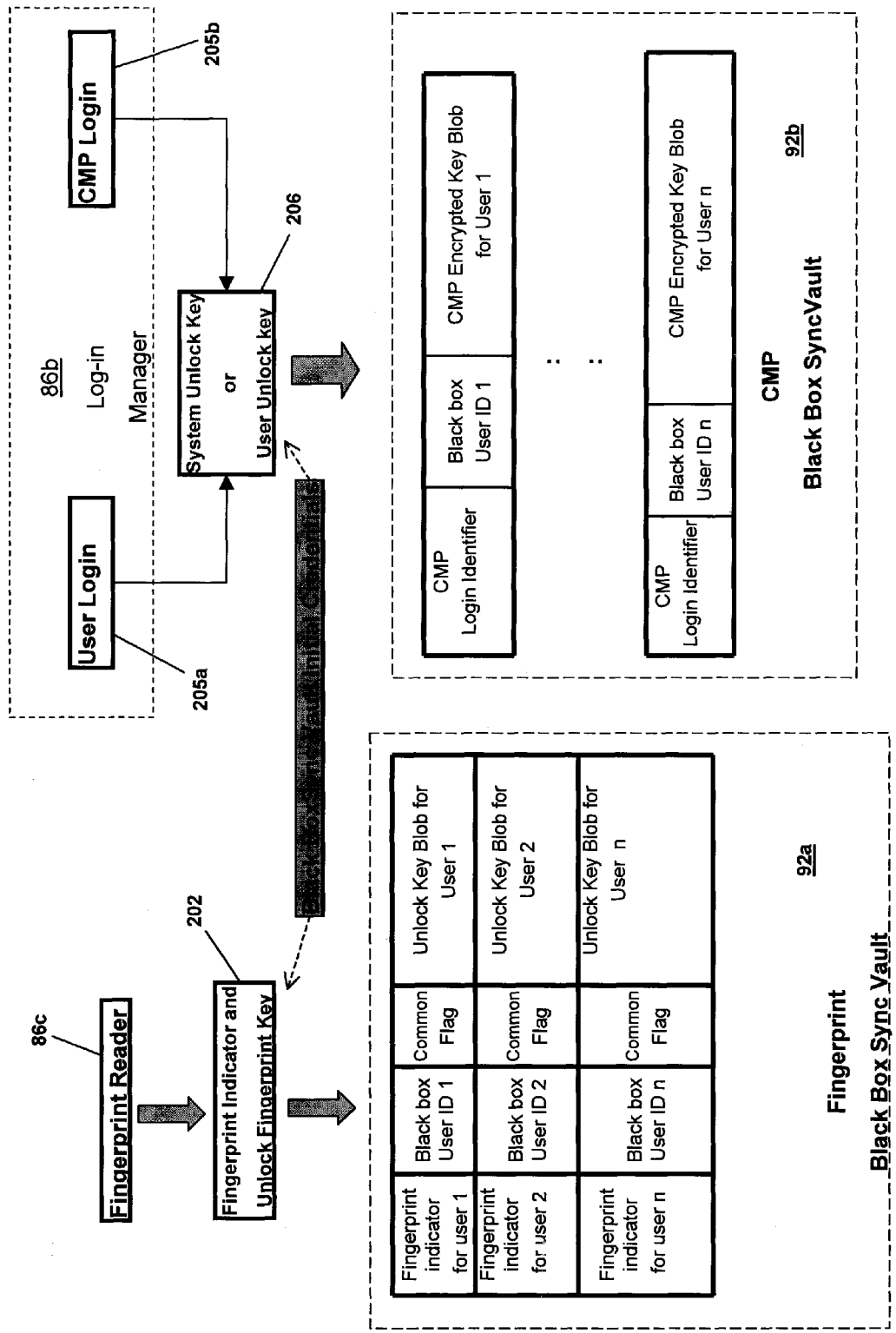
FIG. 2 schematically depicts three implementations for accepting a user login and employing the same to prompt a "black box" architecture into action.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 2, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets a different bus structure, as well as with any other suitable substitute components, while providing comparable or analogous functions to those discussed above.

Indicated at 86 is a BIOS (basic input/output system) whose functioning, in accordance with at least one presently preferred embodiment of the present invention, will be better understood from further discussion herebelow.

As is known conventionally, associated with BIOS 86 is a memory 86a (such as a flash memory), while in accordance with at least one preferred embodiment of the present invention further includes software logical architecture in the form of a login manager 86b. Login manager 86b preferably processes user logins of one or more types, and will be better understood from further discussion herebelow. Preferably also associated with BIOS 86 is additional software logical architecture in the form of a medium for biometric input 86c, which also will be better understood from further discussion herebelow; essentially, and by way of an illustrative an non-restrictive example, this could include a fingerprint reader (i.e., the software that processes a fingerprint image that itself has been fed to the reader 86c by a separate element attached to or otherwise in operative or functional communication with the machine encompassing system 12). Also shown is a "black box" sync vault 92 which is configured for interfacing with user-delineation architectures such as "DANBURY"; sync vaults as such will also be better understood from further discussion herebelow. Preferably, sync vault 92 is directly functionally integrated with BIOS 86, e.g., via residing in or otherwise being functionally connected with the BIOS memory 86a.

As stated heretofore, in accordance with at least one presently preferred embodiment of the present invention, there are broadly contemplated herein arrangements which permit the use of architecture such as "DANBURY" with more than text-based access. Particularly, there is contemplated herein an arrangement which permits an alternative user identifier, such as a biometric identifier, to be used with user-delineating architecture such as "DANBURY".

In a particularly broad sense, there are contemplated herein arrangements for accepting user identifiers that are then communicated to an intermediate user-delineating architecture (i.e., architecture configured for permitting access to encrypted data or sections of a computer on a user-specific basis) in a manner to permit the user-delineating architecture, whatever it may be, to perform its own task of unlocking data or sections of a computer. The user-delineating architecture may thus be thought of as a "black box" that arrangements in accordance with at least one embodiment of the present invention are configured for suitably interfacing with in order to prompt the "black box" to initiate and undertake its own predetermined actions. In accordance with at least one presently preferred embodiment of the present invention, one or more suitable credentials are presented that suitably prompt the "black box" into action.

As presently contemplated, at least three different arrangements for unlocking a "black box" may be employed. In a first arrangement, a biometric or other non-text-based user identifier may constitute the input that results in a credential being presented to the "black box" to prompt the "black box" to decrypt data or computer regions in accordance with criteria predetermined for the user in question. In a second arrangement, a "centralized managed password" (CMP) arrangement is employed in a manner to be described in more detail herebelow. Finally, in a third arrangement, a user may actually input a password in a manner superficially similar to conventional password entry (at least as it may appear to the user), but this is done directly into a "sync vault", in a manner to be better understood herebelow, that proceeds to activate a user-delineating "black box". All three of these arrangements, presented herein as illustrative and non-restrictive examples, can be realized in a system individually or in combination.

FIG. 2 schematically depicts, for illustrative purposes, an arrangement with all three of the above implementations. Two different black box sync vaults are shown, namely, a fingerprint sync vault 92a and a CMP sync vault 92b. The sync vaults 92a/b each serve as an intermediate link between user access to system and a black box (such as "DANBURY") configured for managing user access to data or other portions of a system. For the purpose of illustration, the CMP sync vault 92b is shown as being configured for receiving either or both of a user password input 205a or a CMP input 205b (both via the login manager 86b), but of course either mode of input may each independently feed into a respective dedicated sync vault. Further, it should be understood that a system could include one sync vault for black box interface (e.g., a fingerprint, user password or CMP sync vault) or could include more than one sync vault, each of which could be figured for processing one or more types of user input (e.g., fingerprint, user password and/or CMP). Further, it should be understood that an arrangement for processing fingerprints could alternatively be configured for processing other types of user-based biometric input (e.g., an iris reader, voice recognition, face recognition); even a smart card reader could be employed here to identify a user. As such, it should be understood that there is broadly contemplated herein, in accordance with at least one embodiment of the present invention, a very wide variety of conceivable biometric or non-biometric modes of user input that need not be restricted to those specifically addressed herein.

The left-hand side of FIG. 2 will first be discussed, particularly with regard to a biometric user input. Again, the use of fingerprint identification is provided here by way of a restrictive and non-illustrative example, but of course it should be understood that essentially any type of suitable biometric input may be used.

Fingerprint reader 86c (as an example of biometric input 86c from FIG. 1) will preferably accept data relating to a user's fingerprint image. A module 202 (preferably associated with BIOS 86; see FIG. 1) will then preferably match the fingerprint image with a user (assuming there is a user to be matched) and will then release an "unlock fingerprint key" which represents an "initial credential" for unlocking the black box sync vault 92a. More particularly, the key released for the given user will constitute a credential for according a user a predetermined level or degree of system access; this credential is processed in sync vault 92a in a manner to permit the black box architecture (e.g., "DANBURY") to ultimately perform the actual task of according system access. The credential may otherwise be thought of as a decryption key which serves the ultimate purpose of decrypting for the user those areas of the system predetermined to be accessible to the user, while the sync vault 92a is essentially the interface or "go-between" that prompts the black box architecture to perform its own predetermined task(s), which otherwise may only have been accomplished with a dedicated text-based password associated with the black box architecture. Stated another way, the decryption key represented by the credential actually serves to decrypt the sync vault 92a for the user, which in turn prompts the black box architecture to perform its own dedicated decryption task(s). Though a very wide variety of fingerprint readers could be used in accordance with embodiments of the present invention, an illustrative example could involve fingerprint readers as produced by UPEK, Inc., of Emeryville, Calif. (reference may be made to www.touchchip.com).

FIG. 2 schematically illustrates, by way of example, that sync vault 92a may preferably comprise a lookup scheme for accepting user fingerprint keys and then employing these to prompt release of an appropriate final credential as associated with a given user, whereby this final credential serves to inform the black box architecture of those system areas which may be decrypted for the user in question. More to the point, the final credential essentially will be accepted by the black box architecture as equating to whatever type of password (or other user-identification) scheme the black box architecture normally employs. In other words, the sync vault 92a essentially serves as a conversion module for accepting one type of user-specific identification peculiar to the system in question and converting it to another type of user-specific identification peculiar to the black box architecture that itself is the "gatekeeper" affording user access to predetermined portions of the system.

In the illustrative example at the left side of FIG. 2, then, the lookup scheme of sync vault 92a may preferably act to do the following (as shown):
    accept a fingerprint indicator (identifier) for user 1, 2 ... N;
    look up a preset user ID associated with the black box architecture;
    yield a common flag; and
    yield an "unlock key blob"
Essentially, the unlock key blob for a given user will be the "final credential" sufficient for prompting the black box architecture to perform its own dedicated task as appropriate to that user; this "final credential" can, again, essentially equate to a password or to any other user identifier as normally employed by the black box architecture.

Preferably, the common flag may be employed as an indicator in instances where more than one user (or more than one finger of a user) is intended for using a common entry in the vault 92a; as such, the common flag may preferably flag this intent such that the BIOS will be alerted to itself employ a universally common entry (or key) into the system.

The right-hand side of FIG. 2, for its part, conveys (as stated above) a CMP login and a user password-based login (205b and 205a, respectively) which either alone or in combination may constitute at least a portion of log-in manager 86b. As can be appreciated from the figure, these can preferably function substantially similarly to the fingerprint (or other biometric) login/identification arrangement. As shown, a user password login (205a), as is normally sufficient to access a system, or a CMP login (205b) may initially be employed by a user. For the latter, a user may type in a universal password for his/her use that has the ultimate effect of releasing, from a centralized location, any password or key that would be appropriate for allowing a user to access a specific system or system portion. In other words, rather than employ a multitude of passwords or keys to access a system or different system portions, a CMP can afford the use of what may be thought of as a "universal" password for a user, whereby this "universal" password serves to "release" whatever password(s), key(s) or other decryption element(s) may be needed to unlock, decrypt or permit access to the particular system or system portion to which a user is attempting to gain access. Since the "centralized location" may be a server, with the local location (where a user is logging in) being a client of the server, it can thus be appreciated that a CMP permits a server to control access to a client of the server, such that it would be easy (if needed) to revoke access to the client. Some helpful background information on CMP login may be found in the publication, "A Method of Secure Managed Secure Client PC," at the IP.com Prior Art Database (www.ip.com), IP.com number IPCOM000138248D; this publication is hereby fully incorporated by reference as if set forth in its entirety herein.

User password-based login 205a, for its part, preferably allows for a common method (among different users) to locally release a black box decryption key_and, preferably, could also permit the release of other BIOS-related passwords. By way of comparison to a CMP login arrangement (205b), it should be appreciated that user password-based login 205a essentially operates completely at a local or "client" level while CMP login 205b operates at a local or "client" location in conjunction and cooperation with a central or "server" location.

Similarly to the fingerprint/biometric scenario, a module 206 (preferably associated with BIOS 86; see FIG. 1) will then preferably match the user password or CMP with a user (assuming there is a user to be matched) and will then release a "user unlock key" or "system unlock key", respectively, which now represents the "initial credential" for unlocking CMP black box sync vault 92b (to the extent that user password entry and the employment of CMP may be commonly managed in a greater CMP "module" and consequently may employ the same black box sync vault). These keys are similar to the "unlock fingerprint key" discussed above, and indeed function similarly; accordingly, the discussion relating to the "unlock fingerprint key" above, fundamentally, is equally relevant here.

As with fingerprint sync vault 92a, the CMP sync vault 92b may also preferably comprise a lookup scheme for accepting decryption keys (system or user unlock keys from 206) and then employing these to prompt release of an appropriate final credential as associated with a given user, whereby (again) this final credential serves to inform the black box architecture of those system areas which may be decrypted for the user in question. Here, then, the lookup scheme of sync vault 92b may preferably act to do the following (as shown):

accept a "CMP login identifier" for user 1 . . . N (i.e., a specific user password or user's "universal" CMP password);

look up a preset user ID associated with the black box architecture; and yield an "encrypted key blob"

Here, the encrypted key blob for a given user will be the "final credential" sufficient for prompting the black box architecture to perform its own dedicated task as appropriate to that user; again, this "final credential" can essentially equate to a password or to any other user identifier as normally employed by the black box architecture.

By way of further elaboration and clarification, in accordance with at least one presently preferred embodiment of the present invention, "user login" and "CMP login" essentially may be considered two different methodologies that a CMP module may provide. Essentially, CMP may be thought of as an overall architecture for generating passwords at a server level and providing different login methods to release those passwords in a pre-boot. However, whereas "user login" takes place at a local level (as does fingerprint/biometric access), "CMP login" actually represents locally logging in to a remote server. CMP login also allows users to use a system without the user ever knowing the credentials that are actually used to access the black box system. This makes it easy to revoke the access rights of such users if necessary, and such users in turn would never be in a position to know how to access the system outside of CMP login, thus making it very easy to keep undesired or unauthorized users out of the system. CMP, for its part, can also support "smart card" user access, whereby a smart card is used to release a password or other decrypting element that itself can release a key for unlocking a "black box" credential.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method comprising:
receiving at a user input device a user identification input at a data processing system comprising at least one hardware processor, the user identification input being in a form different from a particular form employed by a user-delineating architecture residing on said data processing system for managing user-based access;
responsive to locating at least one user associated with the user identification input, releasing an initial credential derived from the user identification input received at the user input device;
converting, by a conversion device separate from the user-delineating architecture, the initial credential into a final credential, the final credential being in the particular form employed by said user-delineating architecture; and
providing the final credential to said user-delineated architecture;
wherein said user-delineating architecture allows access to at least one component of said data processing system responsive to accepting the final credential.

2. The method according to claim 1, wherein said releasing comprises releasing a user-specific decryption key.

3. The method according to claim 1, wherein said converting comprises performing a lookup, based on the initial credential, to yield the final credential.

4. The method according to claim 1, wherein the final credential comprises a password in the particular form employed by said user-delineated architecture.

5. The method according to claim 1, wherein said receiving comprises receiving biometric user identification input.

6. The method according to claim 5, wherein said receiving comprises receiving user fingerprint input.

7. The method according to claim 1, wherein said receiving comprises receiving user password input for a remote login.

8. The method according to claim 7, wherein said receiving comprises receiving local password input, the local password input comprising a user-related credential released from a remote server.

9. The method according to claim 1, wherein said accepting the final credential by said user-delineated architecture prompts said user-delineated architecture to perform an access-granting task.

10. The method according to claim 9, wherein said accepting the final credential by said user-delineated architecture triggers user-based decryption of at least one system portion by said user-delineated architecture.

11. The method according to claim 10, wherein said user-delineated architecture manages user-based access at a basic input/output system (BIOS) level.

12. An apparatus comprising:
a main memory;
a basic input/output system (BIOS) operatively coupled to said main memory, the BIOS acting to receive user identification input received at a user input device, the user identification input being in a form different from a particular form employed by a user-delineating architecture residing on said apparatus;
responsive to locating at least one user associated with the user identification input, said BIOS acting to release an initial credential derived from the user identification input received at the user input device;
a conversion vault device separate from the user-delineating architecture which converts the initial credential into a final credential, the final credential being in the particular form employed by the user-delineating architecture ; and
said user-delineating architecture configured to receive said final credential;
wherein said user-delineating architecture allows access to at least one component of said apparatus responsive to accepting the final credential.

13. The apparatus according to claim 12, wherein said BIOS acts to release a user-specific decryption key.

14. The apparatus according to claim 12, wherein said conversion vault device acts to perform a lookup, based on the initial credential, to yield the final credential.

15. The apparatus according to claim 12, wherein the final credential comprises a password recognizable by said user-delineated architecture.

16. The apparatus according to claim 12, wherein said BIOS acts to receive input related to a user fingerprint.

17. The apparatus according to claim 12, wherein said BIOS acts to receive user password input for a remote login.

18. The apparatus according to claim 17, wherein said BIOS acts to receive local password input, the local password input comprising a user-related credential released from a remote server.

19. The apparatus according to claim 12, wherein said user-delineated architecture performs an access-granting task responsive to said accepting the final credential by said user-delineated architecture.

20. The apparatus according to claim 19, wherein said user-delineated architecture triggers user-based decryption of at least one system portion by said user-delineated architecture responsive to said accepting the final credential by said user-delineated architecture.

21. The apparatus according to claim 20, wherein said user delineated architecture manages user-based access at a BIOS level.

22. A program storage device readable by machine, tangibly embodying a program of instructions executable by the machine to perform a method comprising:
receiving at a user input device a user identification input, the user identification input being in a form different from a particular form employed by a user-delineating architecture residing on the machine;
responsive to locating at least one user associated with the user identification input, releasing an initial credential derived from the user identification input received at the user input device;
converting, by a conversion device separate from the user-delineating architecture, the initial credential into a final credential, the final credential being in the particular form employed by said user-delineating architecture ; and
providing the final credential to said user-delineated architecture;
wherein said user-delineating architecture allows access to at least one component of the machine responsive to accepting the final credential.

* * * * *